(12) United States Patent
Matheis et al.

(10) Patent No.: US 11,524,905 B2
(45) Date of Patent: Dec. 13, 2022

(54) BLEND FOR ODOR CONTROL

(71) Applicant: Evoqua Water Technologies LLC, Pittsburgh, PA (US)

(72) Inventors: Timothy Frank Matheis, Palmetto, FL (US); Eric Hansen, Bradenton, FL (US); Narahari Narasiah Kramadhati, San Clemente, CA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 128 days.

(21) Appl. No.: 16/969,760

(22) PCT Filed: Feb. 15, 2019

(86) PCT No.: PCT/US2019/018162
§ 371 (c)(1),
(2) Date: Aug. 13, 2020

(87) PCT Pub. No.: WO2019/161164
PCT Pub. Date: Aug. 22, 2019

(65) Prior Publication Data
US 2020/0399141 A1    Dec. 24, 2020

Related U.S. Application Data

(60) Provisional application No. 62/631,533, filed on Feb. 16, 2018.

(51) Int. Cl.
*C02F 1/00*   (2006.01)
*C02F 1/66*   (2006.01)
(Continued)

(52) U.S. Cl.
CPC ............... *C02F 1/008* (2013.01); *C02F 1/66* (2013.01); *C02F 1/68* (2013.01);
(Continued)

(58) Field of Classification Search
CPC .... C02F 1/008; C02F 1/66; C02F 1/68; C02F 2101/101; C02F 2209/003;
(Continued)

(56) References Cited

U.S. PATENT DOCUMENTS 5,718,944 A * 2/1998 Miller ................. C04B 41/5029
427/427
5,788,841 A * 8/1998 Dickerson ................. C02F 3/34
210/920

(Continued)

*Primary Examiner* — Joseph W Drodge (57) ABSTRACT

A method of providing sustained odor control in an extended sewer line is disclosed. The method includes measuring at least one parameter of the sewer line including average wastewater volume, flow rate, and retention time and administering a blended composition which includes an immediate release compound and an extended release compound into the sewer line to control concentration of an odorous compound therein. A method of facilitating sustained odor control in an extended sewer line is also disclosed. The method includes providing the blended composition including the immediate release compound and the extended release compound and instructing a user to administer the blended composition to the sewer line control concentration of the odorous compound therein. A system for providing sustained odor control in the extended sewer line including sensors to measure sewer line parameters and a controller to instruct administration of the blended composition is also disclosed.

20 Claims, 5 Drawing Sheets

(51) Int. Cl.
*C02F 1/68* (2006.01)
*C02F 101/10* (2006.01)

(52) U.S. Cl.
CPC .. *C02F 2101/101* (2013.01); *C02F 2209/003* (2013.01); *C02F 2209/005* (2013.01); *C02F 2209/06* (2013.01); *C02F 2209/26* (2013.01); *C02F 2209/40* (2013.01); *C02F 2209/42* (2013.01); *C02F 2303/02* (2013.01)

(58) Field of Classification Search
CPC ............ C02F 2209/005; C02F 2209/06; C02F 2209/26; C02F 2209/40; C02F 2209/42; C02F 2303/02; C02F 1/685; C02F 1/686; C02F 1/687; C02F 1/688; C02F 3/001; C02F 3/006; C02F 2201/00; C02F 2209/265; C02F 2209/72; A61L 9/01
See application file for complete search history.

(56) References Cited

U.S. PATENT DOCUMENTS

| | | | |
|---|---|---|---|
| 5,833,864 A | 11/1998 | Miller et al. | |
| 5,948,269 A * | 9/1999 | Stone | C02F 1/5245 210/722 |
| 7,186,341 B2 * | 3/2007 | Hunniford | C02F 1/008 210/916 |
| 7,326,340 B2 | 2/2008 | Harshman et al. | |
| 7,386,340 B2 * | 6/2008 | Schlegel | A61B 5/366 600/517 |
| 7,972,532 B2 | 7/2011 | Simpson et al. | |
| 8,968,646 B2 | 3/2015 | Matheis et al. | |
| 10,131,558 B1 * | 11/2018 | Cox, Jr. | C02F 1/683 |
| 2001/0011643 A1 * | 8/2001 | Newton | C02F 3/10 210/601 |
| 2003/0201227 A1 * | 10/2003 | Perriello | C02F 1/76 210/610 |
| 2005/0145566 A1 * | 7/2005 | Haase | C02F 11/148 210/620 |
| 2005/0224409 A1 * | 10/2005 | Harshman | C02F 3/006 210/209 |
| 2007/0074758 A1 * | 4/2007 | McQuade | C02F 1/008 137/561 R |
| 2009/0242468 A1 * | 10/2009 | Corben | C02F 1/008 210/96.1 |
| 2011/0068060 A1 * | 3/2011 | Hatten | B05B 3/063 210/96.1 |
| 2012/0012188 A1 * | 1/2012 | Matheis | C02F 1/008 137/15.05 |
| 2012/0141407 A1 * | 6/2012 | Dillon | C02F 1/5245 423/489 |
| 2012/0267318 A1 * | 10/2012 | Hatten | C02F 1/78 210/744 |
| 2012/0305476 A1 * | 12/2012 | Giudici-Orticoni | C02F 3/345 210/605 |
| 2014/0263084 A1 * | 9/2014 | Parez | C02F 1/008 210/749 |
| 2015/0353394 A1 * | 12/2015 | Boyette | C02F 3/34 210/85 |
| 2016/0030988 A1 * | 2/2016 | Dugan | C02F 1/72 210/758 |
| 2016/0051929 A1 * | 2/2016 | Harshman | B01D 53/84 210/150 |

* cited by examiner

BLEND FOR ODOR CONTROL

CROSS-REFERENCE TO RELATED APPLICATION

This application claims the benefit under 35 U.S.C. § 119 of U.S. Patent Application No. 62/631,533, titled "Calcium/Magnesium Hydroxide Blend for Odor Control," filed on Feb. 16, 2018, which is incorporated herein by reference in its entirety for all purposes.

FIELD OF TECHNOLOGY

This invention relates to compositions, systems and methods for controlling odor in wastewater.

SUMMARY

In accordance with one aspect, there is provided a method of providing sustained odor control in an extended sewer line. The method may comprise measuring one or more sewer line parameters selected from an average wastewater volume, an average wastewater flow rate, and an average wastewater retention time. The method may comprise incorporating an immediate release alkaline compound and an extended release alkaline compound into a blended composition in an amount sufficient to control an $H_2S$ concentration in the headspace of the sewer line to be 100 ppm or less along a length of the extended sewer line. The method may comprise administering the blended composition to the sewer line in an amount selected responsive to the one or more sewer line parameters.

The method may further comprise measuring one or more sewerage parameters selected from a pH of the wastewater, the $H_2S$ concentration in the headspace of the sewer line, a dissolved sulfide concentration in the wastewater, and a temperature of the wastewater. The one or more sewerage parameters may be measured at an inlet of the sewer line, at a point of administration of the blended composition, or downstream from the point of administration of the blended composition.

In some embodiments, the method may comprise incorporating the immediate release alkaline compound and the extended release alkaline compound in an amount sufficient to control a pH of the wastewater to be 8.0 or greater along the length of the extended sewer line.

The length of the extended sewer line may be at least about 2 miles. The average wastewater retention time within the extended sewer line may be at least about 4 hours.

The method may comprise administering the blended composition at a single point of administration. The method may comprise administering the blended composition in an amount sufficient to control the $H_2S$ concentration in the headspace of the sewer line to be 100 ppm or less along the length of the extended sewer line. The method may comprise administering the blended composition in an amount sufficient to control a pH of the wastewater to be 8.0 or greater along the length of the extended sewer line.

In another aspect, there is provided a method of facilitating odor control in an extended sewer line. The method may comprise providing a blended composition comprising an immediate release alkaline compound and an extended release alkaline compound as active ingredients. The blended composition may be substantially free of other active ingredients. The method may comprise instructing a user to administer the blended composition to the extended sewer line in an amount sufficient to control an $H_2S$ concentration in the headspace of the sewer line to be 100 ppm or less along a length of the extended sewer line.

The method may comprise providing the blended composition comprising the immediate release alkaline compound and the extended release alkaline compound in an amount sufficient to control a pH of wastewater to be 8.0 or greater along the length of the extended sewer line.

The method may comprise providing the blended composition comprising calcium hydroxide as the immediate release composition and magnesium hydroxide as the extended release composition.

The method may comprise providing the blended composition having a total active composition of between about 40% and about 60%.

The method may comprise comprising providing the blended composition having a relative ratio of calcium hydroxide to magnesium hydroxide between about 1:2 to about 1:20.

The method may comprise instructing the user to administer the blended composition at a single point of administration.

In some embodiments, the method may further comprise instructing the user to measure one or more sewer line parameters selected from an average wastewater volume, an average wastewater flow rate, and an average wastewater retention time, and administer the blended composition in an amount selected responsive to the one or more sewer line parameters.

The method may further comprise instructing the user to measure one or more sewerage parameters selected from a pH of the wastewater, the $H_2S$ concentration in the headspace of the sewer line, a dissolved sulfide concentration in the wastewater, and a temperature of the wastewater, and administer the blended composition in an amount selected responsive to the one or more sewer line parameters.

In accordance with yet another aspect, there is provided a system for providing sustained odor control in an extended sewer line. The system may comprise a source of a blended composition connectable to the extended sewer line at a single point of administration, the blended composition comprising an immediate release alkaline compound and an extended release alkaline compound. The system may comprise a metering valve positioned at the single point of administration configured to administer the blended composition to the extended sewer line. The system may comprise at least one sensor constructed and arranged to measure at least one parameter selected from headspace composition in the sewer line, wastewater composition, wastewater pH, wastewater temperature, and wastewater flow rate. The system may comprise a controller operatively connected to the metering valve and to the sensor, the controller configured to instruct the metering valve to administer the blended composition responsive to the at least one parameter, in an amount sufficient to control an $H_2S$ concentration in a headspace of the sewer line to be 100 ppm or less.

The source of the blended composition may comprise a blending subsystem constructed and arranged to incorporate the immediate release alkaline compound and the extended release alkaline compound into the blended composition responsive to the at least one parameter, in an amount sufficient to control the $H_2S$ concentration in the headspace of the sewer line to be 100 ppm or less.

In some embodiments, the at least one sensor may be positioned to measure the parameter downstream from the point of administration of the blended composition.

The controller may be programmable to automatically instruct the metering valve to administer the blended composition responsive to the at least one parameter in an amount sufficient to restore pH of the wastewater to be within tolerance of a target value. The controller may be programmable to recognize trends of the at least one parameter on a schedule and automatically instruct the metering valve to administer the blended composition responsive to the recognized trends in an amount sufficient to restore pH of the wastewater to be within tolerance of a target value.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing.

In the drawings.

DETAILED DESCRIPTION

Odor control in wastewater treatment processes can be accomplished by preventing and/or eliminating hydrogen sulfide gas. Hydrogen sulfide is a colorless and odorous gas created in wastewater collection systems by the biochemical reduction of sulfate. Sulfate is a naturally occurring substance present in most well water supplies, dissolved naturally therein through geologic contact. Sulfate reducing bacteria are commonly present in wastewater collection and treatment systems. The bacteria may convert sulfate to sulfide ions in wastewater systems deficient of dissolved oxygen, a condition typically occurring when wastewater is pumped long distances. Sulfide ions in turn may react with excess hydrogen ions to form the hydrogen sulfide gas which has an offensive odor.

Hydrogen sulfide generation in wastewater is generally dependent on water temperature, biological oxygen demand (BOD) of the sulfate reducing bacteria, and sulfate level in the wastewater. The highest hydrogen sulfide concentrations generally occur in warm temperature climates and/or in the summer months and at high nutrient locations, such as near a sugar refining facility of where ocean water gets infiltrated into a wastewater system. Humans can sense hydrogen sulfide at very low levels in air. Hydrogen sulfide is particularly offensive in concentrations near about 10 ppm and can cause respiratory paralysis if in excess of about 1000 ppm.

Conventional odor control compositions may reduce offensive odors either at the site of application or significantly downstream from the application site. Thus, conventional odor control compositions are not able to uniformly control odor along a sewer line without initial and downstream applications. Furthermore, conventional odor control compositions may not be able to effectively control offensive odors in extended sewer lines, for example, in sewer lines which extend more than about 2 miles or sewer lines which have a wastewater retention time of more than about 4 hours. Many cities have extended sewer lines which do not include multiple access points for administration of additional odor control compositions. There exists a need for uniform and effective odor control in such extended and inaccessible sewer lines.

One or more embodiments disclosed herein relate generally to wastewater treatment. The disclosed methods may control hydrogen sulfide levels in wastewater treatment operations. In some embodiments, the odor control compositions disclosed herein may be used in a lesser quantity than a conventional odor control composition while providing a substantially equivalent level of odor control. In some embodiments, the compositions disclosed herein may provide a superior level of odor control when used in a substantially equivalent amount as compared to a conventional composition. Thus, the methods disclosed herein may diminish the quantity of an odor control composition needed and/or may increase the effectiveness of an odor control treatment process. The compositions disclosed herein may provide substantial cost savings and greater efficiency in odor control, to the benefit of end users.

One or more embodiments relate generally to wastewater treatment methods. A wastewater treatment system may receive wastewater from a community, industrial, or residential source during typical operation. For example, the wastewater may be delivered from a municipal or other large-scale sewage system. The wastewater may be delivered from an industrial or commercial sewage system. The wastewater may be generated, for example, by food processing or pulp and paper plants.

Wastewater may generally be any stream of waste, bearing at least one undesirable constituent, deliverable to the wastewater treatment system for treatment and/or removal. In some embodiments, the undesirable constituents may include organic waste produced by metabolic processes, including human and animal waste. Other undesirable constituents treatable in accordance with one or more embodiments disclosed herein include, but are not limited to, industrial waste, effluents, and sewage. The type and concentration of undesirable constituents present in the wastewater may be site-specific. Communities may establish regulations regarding these undesirable constituents and what may be released from the treatment system. As disclosed herein, wastewater may refer to a stream fed to the system for treatment and a stream treated throughout the system. A process stream generally associated with the treatment system may include wastewater delivered to the system or being processed for treatment by the system.

Wastewater may be associated with a domestic, industrial, commercial or agricultural source. The wastewater may include surface runoff or stormwater. The wastewater may include any sewer inflow or sewer infiltration. In some embodiments, the wastewater to be treated may have an average temperature between about 4° C. and about 27° C. The wastewater to be treated may have an average pH value of between about 6.5 and 7.5. The wastewater to be treated may have a hydrogen sulfide emission profile dependent on factors such as water turbulence and proximity to a hydrogen sulfide area of interest, but can be as high as about 2000 ppm. The wastewater to be treated may have a dissolved sulfide concentration dependent on similar factors, including, for example, the source of the wastewater. The dissolved sulfide concentration can be as high as about 25 mg/L.

Systems and methods disclosed herein may be provided to alter the concentration and/or generation of contaminants in the wastewater. In accordance with some embodiments, the systems and methods disclosed herein may be provided to reduce a concentration and/or generation of hydrogen sulfide gas. In some embodiments, the methods disclosed herein can involve adding an odor controlling composition to the wastewater to reduce or maintain the concentration of hydrogen sulfide to be within a target concentration range or around a target concentration value. The target hydrogen sulfide concentration range can be a value of below at least about 125 ppm. The target hydrogen sulfide concentration range can be a value of below at least about 100 ppm. The target hydrogen sulfide concentration range can be a value of below at least about 20 ppm. The target hydrogen sulfide concentration range can be a value of below at least about 10 ppm. In some embodiments, the target hydrogen sulfide concentration can be from about 8 ppm to about 12 ppm. In some embodiments, the target hydrogen sulfide concentration can be from about 5 ppm to about 10 ppm. In some embodiments, the target hydrogen sulfide concentration can be from about 10 ppm to about 50 ppm. In some embodiments, the target hydrogen sulfide concentration can be from about 85 ppm to about 125 ppm. In some embodiments, a maximum target hydrogen sulfide concentration value may be about 10 ppm, or less than about 10 ppm. In some embodiments, a maximum target hydrogen sulfide concentration value may be about 100 ppm, or less than about 100 ppm.

Hydrogen sulfide ($H_2S$) and bisulfide ($SH^-$) are conjugate acids of sulfide ($S^{2-}$). Systems and methods disclosed herein may involve measuring a concentration of dissolved sulfide in the wastewater. In some embodiments, the methods disclosed herein can involve adding an odor controlling composition to the wastewater to maintain the concentration of dissolved sulfide in the wastewater and reduce or limit the acidification of sulfide ions to hydrogen sulfide.

Figure 1:
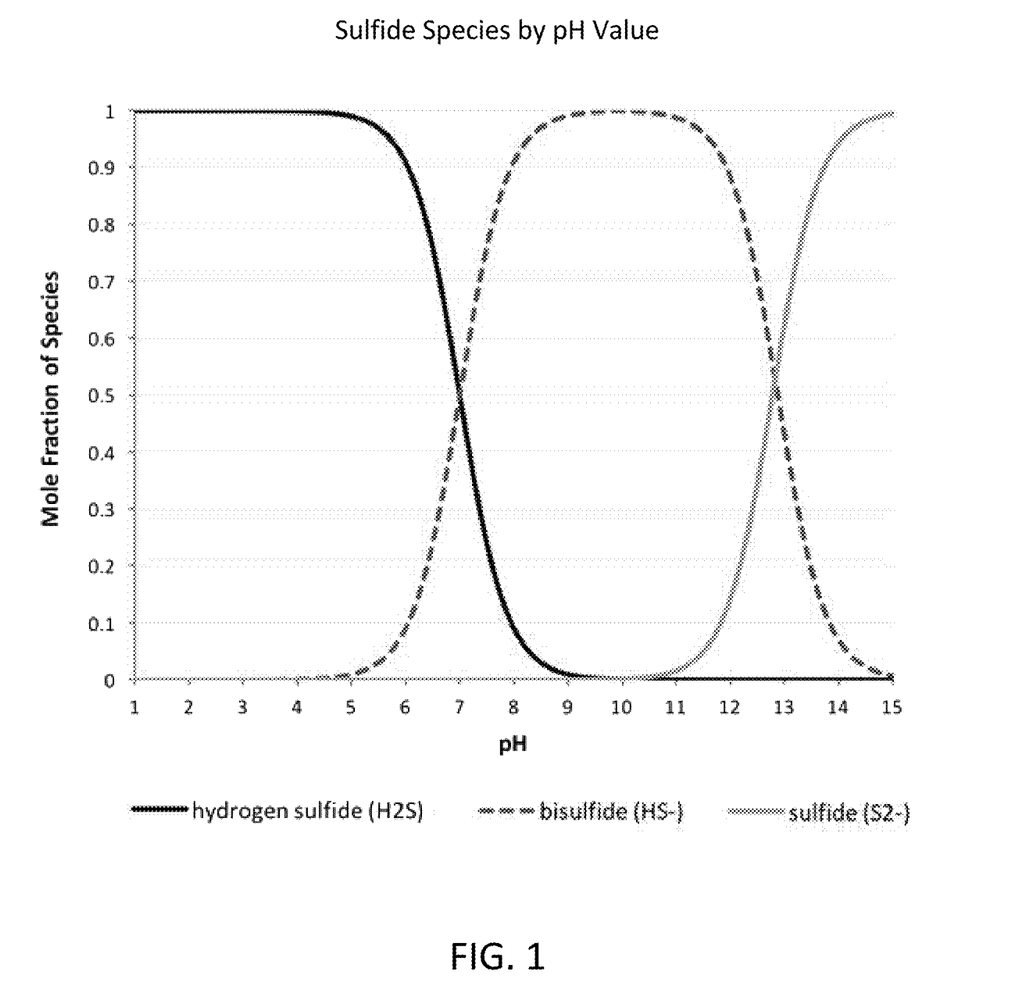
FIG. 1 is a graph of mole fraction of sulfide species by pH value.

The capture of hydrogen sulfide found in wastewater systems (and thus, the odor control) may involve the addition of compounds that alter the pH of the wastewater. The systems and methods disclosed herein can involve shifting or adjusting an equilibrium condition of one or more target odorous species in the wastewater to control odor. For example, the pH may need to be raised to control hydrogen sulfide generation and odor. The graph of FIG. 1 shows mole fraction of hydrogen sulfide by pH value. At lower pH values, sulfide species are in the form of hydrogen sulfide, which emits offensive odors. Thus, when referring to "controlling odor," the method may include controlling or altering pH to adjust an equilibrium condition of the odorous species accordingly.

Systems and methods disclosed herein may be provided to elevate the pH of the wastewater, for example, by the addition of pH-elevating compounds. In some embodiments, the pH may be shifted by the addition of an alkaline compound. Alkaline compounds which may be added include, for example, a hydroxide selected from the group consisting of alkali hydroxides, alkaline earth hydroxides, alkali earth oxides, and ammonium hydroxides. If appropriate, the alkaline compound can include at least one of sodium hydroxide, potassium hydroxide, calcium hydroxide, and magnesium hydroxide. The addition of pH-elevating compounds may further reduce and/or prevent corrosion through the sewerage system.

In some embodiments, the methods disclosed herein can involve adding an odor controlling composition to the wastewater to raise the pH thereof to be within a target pH range or around a target pH value. The target pH range can be a pH value of at least about 8.0 units. The target pH range can be a pH value of at least about 9.0 units. In some embodiments, the target pH range may be from about 8.0 to about 8.4. The target pH range may be from about 8.2 to about 8.6. In some embodiments, the target pH value may be about 8.0 units, or at least 8.0 units. The target pH value may be about 8.2 units, or at least 8.2 units. The target pH value may be about 8.3 units, or at least 8.3 units. In some embodiments, the target pH value may be about 8.4 units, or at least 8.4 units. The target value or range may be selected based on the composition of the wastewater. For instance, the target pH value or range may be selected such that a concentration of the target odorous species is below a desired threshold.

Systems and methods disclosed herein may involve the addition of a blended composition having immediate odor control action and extended odor control action. The blended composition may comprise an immediate release composition and an extended release composition. In some embodiments, the blended composition may consist essentially of or consist of an immediate release composition and an extended release composition. The blended composition may be essentially free of other active ingredients. The blended composition may be a low hazard product for odor control and saponification application. The blended composition may generally provide the added benefit of administering a single product for both immediate reaction and longer reaction zones.

Systems and methods disclosed herein may include the addition of a blended composition having, in part, immediate release action to control hydrogen sulfide generation. The immediate release action may be provided by an immediate release composition in the blended composition. The immediate release composition may have a pH of at least about 10, at least about 11, at least about 12, or at least about 13. In some embodiments, the immediate release composition may have a time of onset on the order of between about 1 second and about 1 hour, for example, between about 1 minute and about 1 hour. The immediate release composition may have a time of onset of about less than 1 minute, about 1 minute, about 5 minutes, about 10 minutes, about 15 minutes, about 30 minutes, about 45 minutes, or about 1 hour. The blended composition may have a similar time of onset of action, for example, on the order of between about 1 minute and about 1 hour. The time of onset of the immediate release action may be controlled by selecting characteristics of the immediate release composition, for example, composition (active ingredient and/or additives), concentration, and particle size.

In some embodiments, the immediate release composition may have a time of active duration on the order of between about 3 hours and about 8 hours, for example, between about 3 hours and about 5 hours. The immediate release composition may have a time of active duration of up to about 3 hours, up to about 4 hours, up to about 5 hours, up to about 6 hours, up to about 7 hours, or up to about 8 hours. The time of active duration of the immediate release action may be controlled by selecting characteristics of the immediate release composition, for example, composition (active ingredient and/or additives), concentration, and particle size.

The active ingredient in the immediate release composition may be selected to provide a quick time of onset of action. The active ingredient in the immediate release composition may have a solubility in water of at least about 1.5 g/L at 20° C. The active ingredient in the immediate release composition may have a solubility in water of at least about 1.7 g/L at 20° C. The active ingredient in the immediate release composition may have a solubility in water of between about 1.5 g/L and about 2.0 g/L at 20° C., between about 1.6 g/L and about 1.9 g/L at 20° C., or between about 1.7 g/L and about 1.8 g/L at 20° C. The active ingredient in the immediate release composition may have an average dry particle size of between about 1 µm and about 5 µm. The active ingredient in the immediate release composition may have an average dry particle size of about 2 µm, about 3 µm, about 4 µm, or about 5 µm. In some non-limiting embodiments, the immediate release composition may have a solubility in water of about 1.7 g/L at 20° C. and an average dry particle size of about 2 µm.

One exemplary active ingredient in the immediate release composition is calcium hydroxide. Calcium hydroxide dissolves readily in water. Calcium hydroxide may be included in the immediate release composition to provide a time of onset of action of between about 1 minute and about 1 hour. In some embodiments, calcium hydroxide addition to wastewater will allow a pH shift of above 9.0, which may fully capture hydrogen sulfide. The immediate release composition may comprise calcium hydroxide. The immediate release composition may consist essentially of calcium hydroxide. In some embodiments, the immediate release composition may consist of calcium hydroxide. The immediate release composition may have between about 25% and about 45% calcium hydroxide. In some non-limiting embodiments, the immediate release composition may be AlkaGen® Solution (distributed by Evoqua Water Technologies LLC, Pittsburgh, Pa.). In one non-limiting exemplary embodiment, between about 140-160 gallons of 25% calcium hydroxide slurry may be administered per million gallons per day (gpd) of wastewater to raise the pH of the wastewater above 8.0. The amount of calcium hydroxide slurry to raise the pH may be dependent on the starting wastewater buffering ability and/or alkalinity (wastewater composition).

Systems and methods disclosed herein may include the addition of a blended composition having, in part, extended release action to control hydrogen sulfide generation. The extended release action may be provided by an extended release composition in the blended composition. The extended release composition may dissolve slower in the wastewater than the immediate release composition. The extended release composition may have a pH of at least about 9, at least about 10, at least about 11, or at least about 12. In some embodiments, the extended release composition may have a time of onset on the order of between about 1 hour and about 8 hours, for example, between about 3 hours and about 8 hours. The extended release composition may have a time of onset of about 1 hour, about 2 hours, about 3 hours, about 4 hours, about 5 hours, about 6 hours, about 7 hours, or about 8 hours. The blended composition may have a similar time of onset of extended action, for example, between about 1 hour and about 8 hours. The time of onset of the extended release action may be controlled by selecting characteristics of the extended release composition, for example, composition (active ingredient and/or additives), concentration, and particle size.

The active ingredient in the extended release composition may be selected to provide a delayed time of onset of action. The active ingredient in the extended release composition may have a lower solubility in water than the active ingredient of the immediate release composition. The active ingredient in the extended release composition may have a solubility in water of less than about 0.01 g/L at 20° C. The active ingredient in the extended release composition may have a solubility in water of between about 0.01 g/L and about 0.001 g/L at 20° C., between about 0.01 g/L and about 0.005 g/L at 20° C., or between about 0.01 g/L and about 0.008 g/L at 20° C. The active ingredient in the extended release composition may have a solubility in water of at least about 0.006 g/L at 20° C. The active ingredient in the extended release composition may have a dry particle size of between about 1 µm and about 10 µm. The active ingredient in the extended release composition may have an average dry particle size of about 5 µm, about 6 µm, about 7 µm, or about 8 µm. In some non-limiting embodiments, the extended release composition may have a solubility in water of about 0.006 g/L at 20° C. and an average dry particle size of about 7 µm.

One exemplary active ingredient in the extended release composition is magnesium hydroxide. Magnesium hydroxide, for example, dissolves slower in water than calcium hydroxide. Magnesium hydroxide may be included in the extended release composition to provide a time of onset of action between about 1 hour and about 8 hours, for example, between about 3 hours and about 8 hours. The extended release composition may comprise magnesium hydroxide. The extended release composition may consist essentially of magnesium hydroxide. In some embodiments, the extended release composition may consist of magnesium hydroxide. The extended release composition may have between about 50% and about 65% magnesium hydroxide. In one non-limiting exemplary embodiment, between about 80-120 gallons of 60% magnesium hydroxide slurry may be administered per million gallons per day (gpd) of wastewater to raise the pH of the wastewater above 8.3. The amount of magnesium hydroxide slurry to raise the pH may be dependent on the starting wastewater buffering ability and/or alkalinity (wastewater composition).

In some embodiments, an exemplary blended composition including calcium hydroxide as an immediate release composition and magnesium hydroxide as an extended release composition may provide sustained odor control in an extended sewer line. Such a blended composition is a low hazard product which may provide both odor control and saponification of the wastewater. Additionally, such a blended product may assist in reducing and/or preventing corrosion through the sewerage system.

In accordance with certain embodiments, the blended composition may comprise a concentration of the immediate release composition of between about 5% and about 45% by weight. The blended composition may comprise a concentration of the extended release composition of between about 20% and about 60% by weight. In other embodiments, the blended composition may comprise a concentration of the immediate release composition of between about 10% and about 60% by weight. The blended composition may comprise a concentration of the extended release composition of between about 40% and about 90% by weight.

In some embodiments, the blended composition may have a ratio of immediate release composition to extended release composition of between about 1:1 to about 5:1, between about 1:1 to about 2:1, between about 1:1 to about 10:1, or between about 1:1 to about 20:1. For example, the blended composition may contain the immediate release composition and extended release composition at a ratio of about 1:1, about 2:1, about 3:1, about 4:1, about 5:1, about 10:1, or about 20:1.

In some embodiments, the blended composition may have a ratio of immediate release composition to extended release composition of between about 1:1 to about 1:20, between about 1:1 to about 1:5, between about 1:2 to about 1:3, between about 1:2 to about 1:9, between about 1:5 to about 1:10, or between about 1:2 to 1:20. For example, the blended composition may contain the immediate release composition and extended release composition at a ratio of about 1:2, about 1:3, about 1:4, about 1:5, about 1:6, about 1:7, about 1:8, about 1:9, about 1:10, about 1:15, or about 1:20.

The relative concentration of the immediate release composition and extended release composition may be selected based on average volume of the wastewater and average flow rate of the wastewater. In some embodiments, the relative concentration of the immediate release composition and extended release composition may be selected based on the retention time of the wastewater through the sewer line. These parameters may be calculated based on dimensions of the extended sewer line, for example, based on the sewer line diameter and length. The relative ratio may be selected such that the hydrogen sulfide may be controlled throughout the length of the extended sewer line. A larger sewer line and/or a sewer line with a greater retention time of wastewater may require a greater concentration of the extended release composition.

The composition, relative ratio, and/or concentration of the immediate release composition and extended release composition may be selected based on average temperature of the wastewater at the geographic location of the sewer line, for example, seasonally. Generation of hydrogen sulfide is generally dependent on wastewater temperature. For instance, there is a greater generation of hydrogen sulfide gas in wastewater that has warmer temperatures, such as wastewater in warm climate geographic locations, during the summer months, or both. In certain embodiments, a greater concentration of odor control compositions may be introduced into the blended product and/or a greater amount of the blended product may be administered to the sewer line in warmer temperatures, for example, temperatures greater than about 25° C. The concentration of odor control compositions administered at warmer colder temperatures may generally be an amount sufficient to control hydrogen sulfide gas generation and/or pH of the wastewater to a target value, as previously described.

Additionally, solubility of the odor control compositions is generally dependent on temperature. To provide adequate odor control, temperature may need to be considered. In certain embodiments, a greater concentration of odor control compositions may be introduced into the blended product and/or a greater amount of the blended product may be administered to the sewer line in colder temperatures, for example, temperatures below about 15° C. The concentration of odor control compositions administered at such colder temperatures may generally be an amount sufficient to control hydrogen sulfide gas generation and/or pH of the wastewater to a target value, as previously described.

The blended composition may be formulated as a liquid, a solid, or a slurry. The blended composition generally includes the immediate release composition and the extended release composition as active ingredients. The blended composition may be essentially free of other active ingredients. For example, the blended composition may be essentially free of physiochemical modifiers and bioavailability promoters, for example, anthraquinones. In another example, the blended composition may be essentially free of nitrate and/or nitrogenous compounds, for example, nitrate salt and calcium nitrate. The blended composition may include inactive ingredients to provide desired properties of the formulation. The blended composition may include the immediate release composition and the extended release composition in suspension. In some embodiments, the blended composition may include one or more inactive ingredients to keep the active ingredients in suspension. For example, the blended composition may include one or more polymer dispersants.

The blended composition may be added to the wastewater treatment system as a liquid, a solid, or a slurry. In some embodiments, the blended composition is an aqueous solution of the immediate release composition and the extended release composition. In some embodiments, the blended composition may comprise solid particles of the immediate release composition and/or extended release composition. The particle size may be selected to provide a desired time of onset of action.

The blended composition may have a total active composition of between about 25% and about 60%. The blended composition may have a total active composition of between about 40% and about 60%. For example, the blended composition may have a total active composition of about 25%, about 40%, about 50%, or about 60%. The total active composition may be selected to provide a desired time of onset of action. The total active composition may have a relative ratio of immediate release composition to extended release composition as previously described.

The blended composition may be administered to any sewer line, including both gravity and forced main or pressure main type applications. The blended composition may be administered to a lift station, headworks, or basin of the sewerage system. The method of addition is non-limiting. In some embodiments, the blended composition may be added to the sewer line at a single upstream point and provide immediate and extended odor control throughout the length of the sewer line. In other embodiments, the blended composition may be added at multiple points along the sewer line. For example, an initial dose may be administered at a first point, followed by one or more booster doses administered downstream from the initial dose. The blended composition may be administered in discrete doses, for example, periodically or as-needed. The blended composition may be administered continuously or substantially continuously.

The blended composition may be added at a flow rate of between about 800 gal. and about 1200 gal. per 6 million gal. of wastewater. For example, the blended composition may be added at a flow rate of about 800 gal. per 6 million gal. of wastewater, about 900 gal. per 6 million gal. of wastewater, about 1000 gal. per 6 million gal. of wastewater, about 1050 gal. per 6 million gal. of wastewater, about 1100 gal. per 6 million gal. of wastewater, or about 1200 gal. per 6 million gal. of wastewater. The rate of administration of the blended composition may be selected to provide odor control through the length and retention time of the sewer line. The rate of administration of the blended composition may be adjusted depending on the flow rate of the wastewater.

The sewer line may be an extended sewer line. An extended sewer line may include sewer lines that are constructed to carry wastewater long distances. In some embodiments, the sewer line may be longer than about 2 miles. The sewer line may be longer than about 5 miles, longer than about 10 miles, longer than about 12 miles, longer than about 15 miles, longer than about 18 miles, longer than about 20 miles, or longer than about 25 miles. The sewer line may have a retention time of more than about 4 hours. The sewer line may have a retention time of more than about 5 hours, more than about 6 hours, more than about 7 hours, more than about 8 hours, more than about 9 hours, more than about 10 hours, or more than about 12 hours.

Some extended sewer lines do not include multiple access points. Thus, the systems and methods disclosed herein may be designed to provide adequate odor control from a single point of administration of an odor control composition, which may be the only available point of administration for a long-distance sewer line. The blended composition may include the immediate release composition and the extended release composition in a ratio sufficient to provide odor control for the length and retention time of the extended sewer line when administered at a single point of administration. The blended composition may be administered in an amount sufficient to provide odor control for the length and retention time of the extended sewer line when administered at a single point of administration. In some embodiments, the blended composition may be administered in an amount sufficient to provide odor control for the length and retention time of the extended sewer line with a single discrete administration of the blended composition.

One or more embodiments of the invention can be directed to a system that is connectable or contains at least one source of a blended odor controlling composition having an immediate release composition and an extended release composition.

The addition of the blended composition can be controlled based on the sensing of hydrogen sulfide concentration. Set points may be used to determine when to start and stop addition of the blended composition based on hydrogen sulfide concentration. Hydrogen sulfide sensors may be positioned at one or more locations within the system including, for example, upstream from the point of addition of the blended composition, at the point of addition of the blended composition, and downstream from the point of addition of the blended composition.

The addition of the blended composition can be controlled based on the sensing of dissolved sulfide concentration. Set points may be used to determine when to start and stop addition of the blended composition based on dissolved sulfide concentration. Dissolved sulfide sensors may be positioned at one or more locations within the system including, for example, upstream from the point of addition of the blended composition, at the point of addition of the blended composition, and downstream from the point of addition of the blended composition.

The addition of the blended composition can be controlled based on the sensing of wastewater pH. Set points may be used to determine when to start and stop addition of the blended composition based on wastewater pH. Sensors for pH may be positioned at one or more locations within the system including, for example, upstream from the point of addition of the blended composition, at the point of addition of the blended composition, and downstream from the point of addition of the blended composition.

The addition of the blended composition can be controlled based on the sensing of wastewater flow rate. Set points may be used to determine when to start and stop addition of the blended composition based on wastewater flow rate. Flow meters may be positioned at one or more locations within the system including, for example, upstream from the point of addition of the blended composition, at the point of addition of the blended composition, and downstream from the point of addition of the blended composition.

The addition of the blended composition can be controlled based on the sensing of temperature. Set points may be used to determine when to start and stop addition of the blended composition based on temperature. Furthermore, the composition, relative ratio, and/or concentration of immediate release composition and extended release composition in the blended composition may be selected based on an average temperature of the geographic location of the extended sewer line, for example, on a seasonal basis. Thermometers may be positioned at one or more locations within the system including, for example, upstream from the point of addition of the blended composition, at the point of addition of the blended composition, and downstream from the point of addition of the blended composition.

The addition of the blended composition can be controlled based on the sensing of immediate release composition or extended release composition. Set points may be used to determine when to start and stop addition of the blended composition based on the composition concentration in the wastewater. Composition analyzers may be positioned at one or more locations within the system including, for example, upstream from the point of addition of the blended composition, at the point of addition of the blended composition, and downstream from the point of addition of the blended composition.

Systems and methods disclosed herein may further take into consideration the source of the wastewater. Certain wastewater sources may have a greater biological nutrient level, which may contribute to a greater concentration of generated hydrogen sulfide. Certain wastewater sources may have a greater concentration of dissolved sulfide, which may similarly contribute to a greater concentration of generated hydrogen sulfide. Thus, the addition of the blended composition may be controlled based on information regarding the source of the wastewater and/or a prediction as to whether the wastewater will generate an undesirable concentration of hydrogen sulfide gas.

The system may include one or more sensors or monitoring devices disposed to measure a parameter or condition of the wastewater or one or more components of the odor control system. Non-limiting examples of sensors include composition analyzers (for example, hydrogen sulfide sensors or sensors for a component of the blended composition), pH sensors, temperature sensors, and flow sensors. The composition analyzers may be configured to sense a composition of the wastewater or headspace. The one or more sensors or monitoring devices may provide a signal or representation of the measured parameter of the wastewater. These parameters can be used to control the addition of the blended composition. A control system may be disposed or configured to receive one or more signal from the sensor or the monitoring device in the odor control system. The control system can be further configured to provide one or more output or control signals to the source of the blended composition.

The one or more control systems can be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include PLCs, specially-programmed, special-purpose hardware, for example, an application-specific integrated circuit (ASIC) or controllers intended for analytical systems.

The control system can include one or more processors typically connected to one or more memory devices, which can comprise, for example, any one or more of a disk drive memory, a flash memory device, a RAM memory device, or other device for storing data. The one or more memory devices can be used for storing programs and data during operation of the odor control system and/or the control subsystem. For example, the memory device may be used for storing historical data relating to the parameters over a period of time, as well as operating data. Software, including programming code that implements embodiments of the invention, can be stored on a computer readable and/or writeable nonvolatile recording medium, and then typically copied into the one or more memory devices wherein it can then be executed by the one or more processors. Such programming code may be written in any of a plurality of programming languages, for example, ladder logic, Java, Visual Basic, C, C#, or C++, Fortran, Pascal, Eiffel, Basic, COBOL, or any of a variety of combinations thereof.

Components of the odor control system may be coupled by one or more interconnection mechanisms, which may include one or more busses, e.g., between components that are integrated within a same device, and/or one or more networks, e.g., between components that reside on separate discrete devices. The interconnection mechanism typically enables communications, e.g., data, instructions, to be exchanged between components of the system.

The control system can further include one or more input devices, for example, a keyboard, mouse, trackball, microphone, touch screen, and one or more output devices, for example, a printing device, display screen, or speaker. In addition, the control system may contain one or more interfaces that can connect to a communication network, in addition or as an alternative to the network that may be formed by one or more of the components of the control system.

According to one or more embodiments of the invention, the one or more input devices may include the one or more sensors for measuring the one or more parameters of the wastewater. Alternatively, the sensors, the metering valves and/or pumps, or all of these components may be connected to a communication network that is operatively coupled to the control system. For example, sensors may be configured as input devices that are directly connected to control system and metering valves and/or pumps of the source of the blended composition may be configured as output devices that are connected to the control system, and any one or more of the above may be coupled to another ancillary computer system or component so as to communicate with the control system over a communication network. Such a configuration permits one sensor to be located at a significant distance from another sensor or allow any sensor to be located at a significant distance from any subsystem and/or the controller, while still providing data therebetween.

The control system can include one or more computer storage media such as readable and/or writeable nonvolatile recording medium in which signals can be stored that define a program to be executed by one or more processors. The storage or recording medium may, for example, be a disk or flash memory. In typical operation, the processor can cause data, such as code that implements one or more embodiments of the invention, to be read from the storage medium into a memory device that allows for faster access to the information by the one or more processors. The memory device is typically a volatile, random access memory such as a dynamic random access memory (DRAM) or static memory (SRAM) or other suitable devices that facilitates information transfer to and from the one or more processors.

Although the control system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the one or more controllers can be performed in separate computers, which in turn, can be communication through one or more networks.

Figure 2:
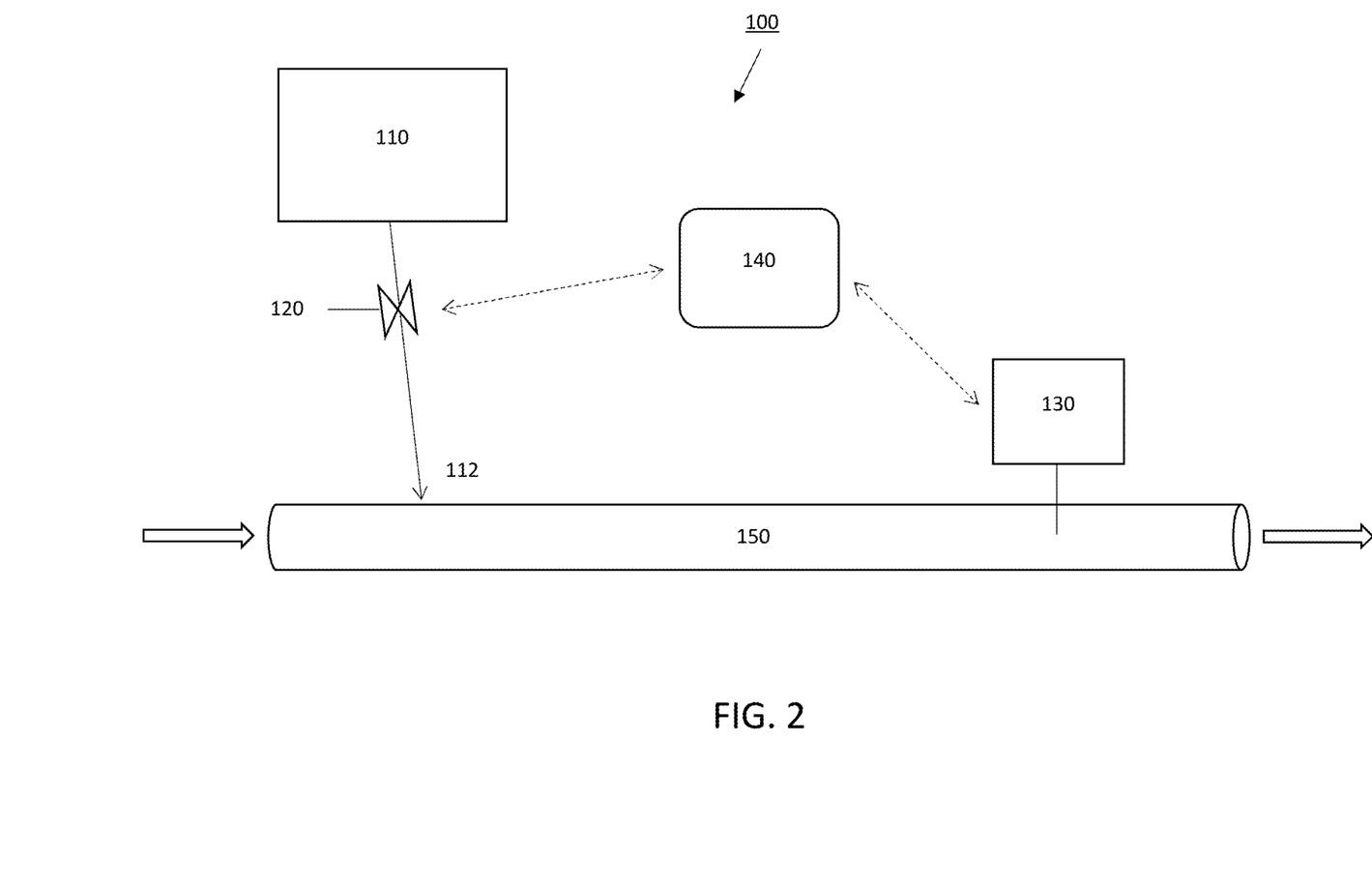
FIG. 2 is a box diagram of an exemplary system for odor control, in accordance with one or more embodiments.

FIG. 2 is a box diagram of an exemplary system for odor control. The system 100 of FIG. 1 includes a source of a blended composition 110. The source of the blended composition 110 is connected to a sewer line 150 through point of administration 112. The system includes metering valve 120 configured to administer the blended composition to the sewer line 150. The system includes sensor 130 configured to measure a parameter downstream from the point of administration 112. The system further includes controller 140 operatively connected to sensor 130 and metering valve 120. The controller 140 is configured to instruct the metering valve 120 to dispense the blended composition responsive to a measurement obtained from the sensor 130.

Figure 3:
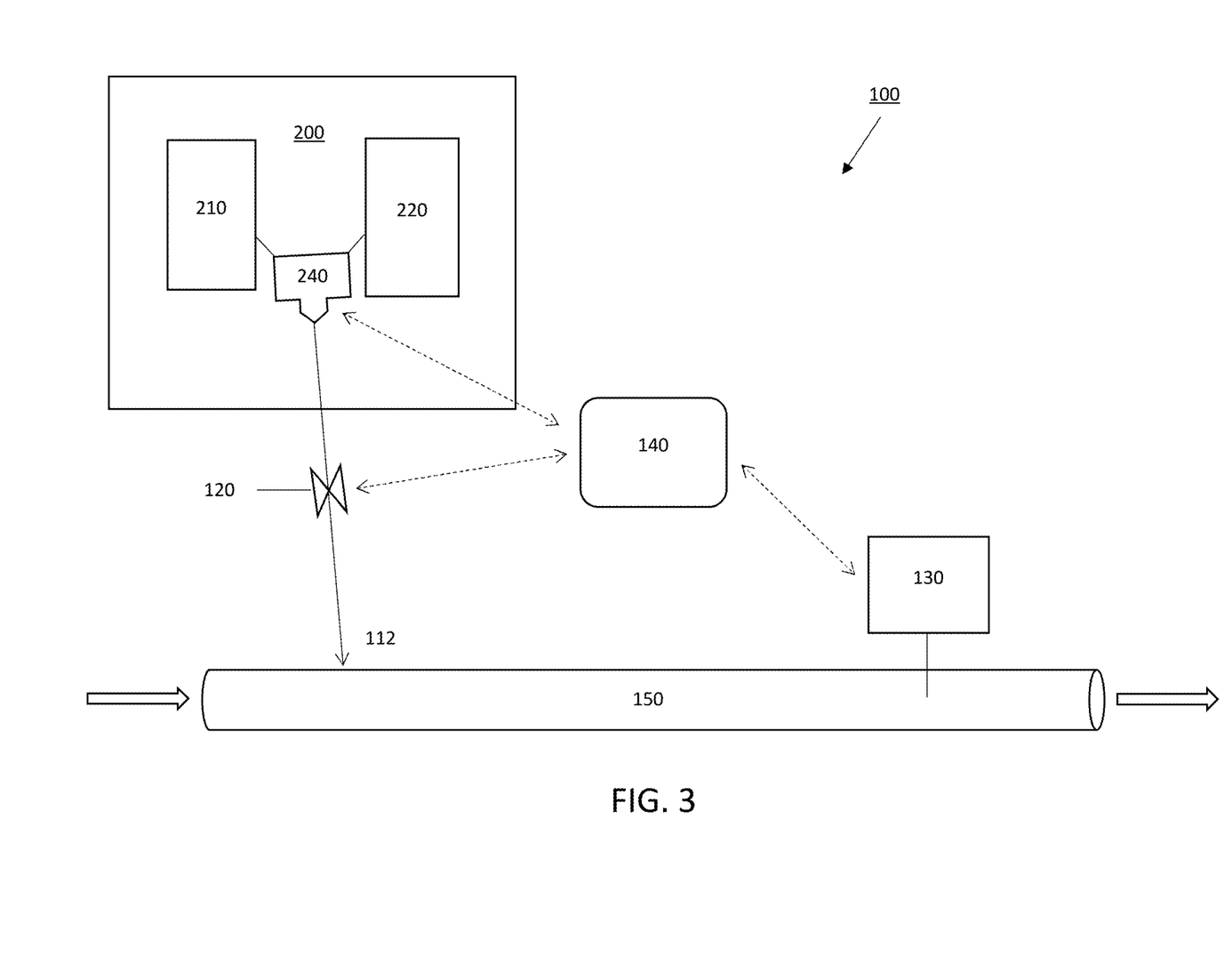
FIG. 3 is a box diagram of an alternate exemplary system for odor control, in accordance with one or more embodiments.

FIG. 3 is a box diagram of an exemplary system for odor control which further includes a blending subsystem 200. The blending subsystem 200 may be associated with or part of the source of the blended composition 110. The blending subsystem 200 includes a source of an immediate release alkaline compound 210 and a source of an extended release alkaline compound 220. Each of the sources of alkaline compound 210 and 220 is connected to blending valve 240, which is connected to the controller 140, such that the controller 140 may instruct the blending valve 240 to administer blended composition having a relative ratio of immediate release composition to extended release composition responsive to the measurement obtained from the sensor 130. In alternate embodiments, each of the source of immediate release composition and extended release composition may be associated with their own metering valve. In such embodiments, the source of the blended composition may further include a blending tank configured to incorporate the compositions into a blended composition.

Figure 4:
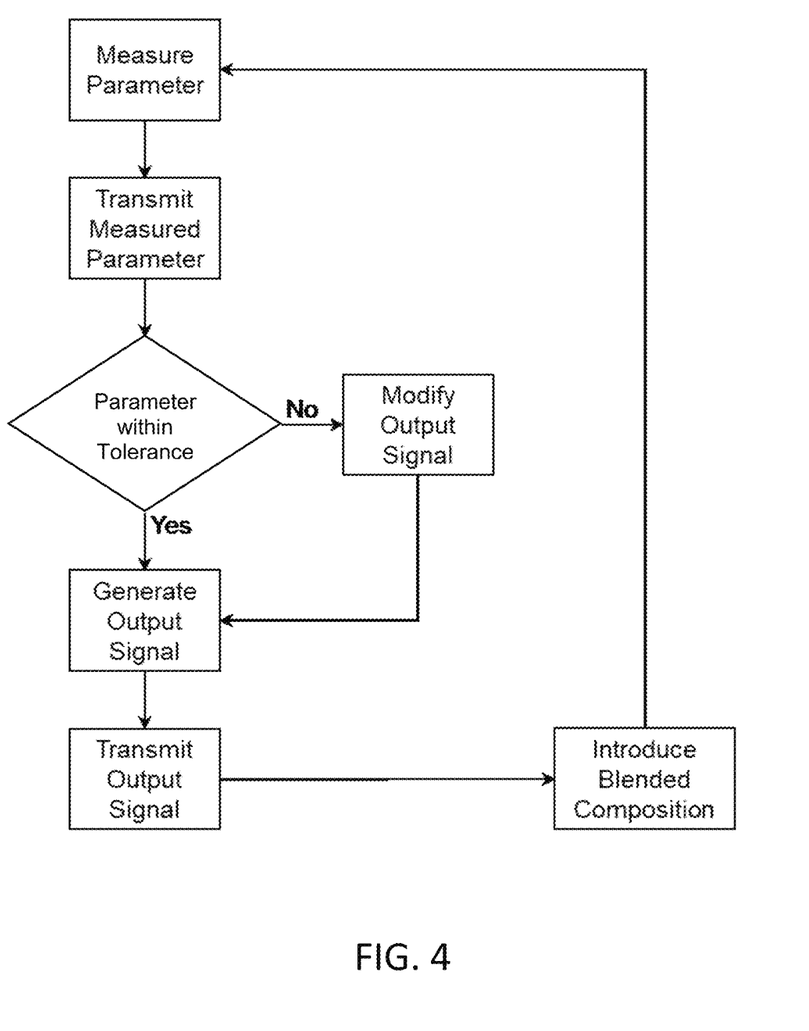
FIG. 4 is a flowchart showing of a control scheme which can be implemented in a control system in accordance with one or more embodiments.

FIG. 4 is an exemplary flowchart that depicts an exemplary algorithm in one or more control systems and techniques in accordance with one or more aspects disclosed herein. The control approach can involve measuring one or more parameters or conditions of the odor control system, wastewater in the sewerage system, and/or an environment of the sewerage system such as the headspace in a sewerage line. Control can then comprise transmitting the measured parameter and determining if the measured parameter is within tolerance of a target value of the parameter. The parameter can be, for example, the pH of the wastewater, the concentration of an odorous species, the concentration of an odor control species, or more than one of these. The tolerance can be, for example, within 10% of the target value or, in some configurations, within 5% of the target value. If the measured parameter is not within the tolerance, then an output signal is modified, generated, and transmitted to a source of the blended composition. The output signal may instruct the source of the blended composition to introduce an appropriate amount of the blended composition, for example, through a metering valve or pump, to place the measured parameter within tolerance of the target value.

The depicted closed loop control scheme is exemplarily presented in a feedback loop but one or more aspects can be implemented utilizing a feedforward control approach.

The blended composition, having an immediate release composition and an extended release composition, may be introduced into a wastewater stream in a sewerage system at a first location. The one or more sensors may be disposed at the point of introduction, downstream of the point of introduction, or upstream of the point of introduction.

Further, an open control scheme may also be utilized, alone or with closed loop control scheme. For example, a predetermined treating schedule may be utilized. The predetermined treating schedule may utilize a plurality of time-of-day, day-of-week, and/or month-of-year target treating output values. For example, the treating schedule may comprise an array of control values that varies hourly, daily, and/or monthly.

A proportional integral derivative (PID) type controller may be utilized. The PID controller may function by continuously calculating an error value as the difference between the target value and the measured parameter. The PID controller may further automatically apply correction to restore the measured parameter to be within tolerance of the target value in an optimal way, without delay or overshoot, by controlling volume and/or timing of introduction of the blended composition. The controller may be programmable to automatically instruct the metering valve to administer the blended composition responsive to the at least one parameter in an amount sufficient to restore the hydrogen sulfide concentration and/or pH value to be within tolerance of a target value.

Additionally or alternatively, a fuzzy logic controller may be utilized. The fuzzy logic controller may "learn" over time the wastewater trends and respective blended composition addition requirements. The fuzzy logic controller may learn the requirements based on a schedule, for example, time-of-day, day-of-week, and/or month-of-year treating schedule and operate to provide the required amount of the blended composition accordingly. The controller may be programmable to recognize trends of the at least one parameter on a schedule and automatically instruct the metering valve to administer the blended composition responsive to the recognized trends in an amount sufficient to restore the hydrogen sulfide concentration and/or pH value to be within tolerance of a target value. The trends may be associated with one or more of the parameters measurable by the sensor.

In accordance with certain embodiments, there is provided a method of facilitating odor control in a sewerage system. The method may comprise determining the presence of at least one odorous compound in the sewerage system, and providing a blended composition including an immediate release composition and an extended release composition. The amount of the blended composition may be selected to provide odor control to a predetermined length or volume of the sewerage system. The relative ratio of the immediate release composition to the extended release composition may be selected to provide odor control to a predetermined length or volume of the sewerage system. The method, in accordance with some embodiments, can further comprise providing instructions to determine or adjust the relative ratio of an amount of the immediate release composition to an amount of the extended release composition.

Methods disclosed herein may comprise providing a blended composition including an immediate release composition and an extended release composition. The immediate release composition and the extended release composition may be the active ingredients in the blended composition. In some embodiments, the blended composition is substantially free of other active ingredients. The methods disclosed herein may further comprise instructing a user to administer the blended composition in an amount sufficient to control the hydrogen sulfide concentration within the sewer line and/or pH of the wastewater. Furthermore, the blended composition may be administered at a single point of administration in an amount sufficient to control the hydrogen sulfide along the length of the extended sewer line.

The amount of the blended composition administered may be selected based on average volume of the wastewater and average flow rate of the wastewater. In some embodiments, the amount of the blended composition may be selected based on the retention time of the wastewater through the sewer line. These parameters may be calculated based on dimensions of the extended sewer line, for example, based on the sewer line diameter and length. The amount of the blended composition may be selected based on a parameter of the wastewater, for example, pH, hydrogen sulfide concentration (in the headspace), temperature, or dissolved sulfide concentration. The amount of the blended composition may be selected such that the hydrogen sulfide may be controlled throughout the length of the extended sewer line. In some embodiments, the amount of the blended composition may be selected such that pH of the wastewater is controlled to be within a target value. A larger sewer line and/or a sewer line with a greater retention time of wastewater may require a greater volume of the blended composition.

Methods disclosed herein may comprise incorporating the immediate release composition and the extended release composition into the blended composition. The amounts of each composition and/or relative ratio may be sufficient to control hydrogen sulfide concentration in the wastewater. The amounts of each composition and/or relative ratio may be sufficient to control pH of the wastewater. In some embodiments, the amount of the immediate release composition and the amount of the extended release composition incorporated into the blended composition may be selected based on average volume of the wastewater and average flow rate of the wastewater. The amount may be selected based on the retention time of the wastewater through the sewer line. Additionally or alternatively, the amounts may be selected based on a parameter of the wastewater, for example, pH, hydrogen sulfide concentration (in the headspace), temperature, or dissolved sulfide concentration.

To determine an amount or composition of the blended composition to be added to the wastewater, methods disclosed herein may comprise measuring at least one parameter or dimension of the sewer line. Methods may additionally or alternatively comprise measuring at least one wastewater or headspace parameter. In some embodiments, methods may comprise instructing a user to measure one or more of the parameters. The parameter may be measured at an inlet of the sewer line, at a point of administration of the blended composition in the sewer line, or downstream from the point of administration of the blended composition. Due to the nature of certain extended sewer lines, in some embodiments, the blended composition may be administered at a single point of administration. The parameters may be measured with devices and systems disclosed herein or calculated by methods known in the art.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1: Blended Compositions

An exemplary blended composition may have a total calcium hydroxide concentration of 25%. The blended composition may have a total active concentration of 50%. The blended composition may be 2 parts dilute calcium hydroxide solution and 1 part concentrated magnesium hydroxide solution.

An alternate exemplary blended composition may have a total active concentration of 50% and a 2:1 ratio of calcium hydroxide to magnesium hydroxide. Such a blended composition may be administered to a wastewater system with a high sulfide species concentration at the inlet.

Yet another exemplary blended composition may have a total active concentration of 60% and a 1:9 ratio of calcium hydroxide to magnesium hydroxide. Such a blended composition may be administered to a wastewater system with a high microbiological population, capable of generating hydrogen sulfide gas downstream.

Example 2: Municipal Water Odor Control

Odor was treated in a wastewater transfer pipeline extending a distance of 22 miles. The total average daily wastewater flow rate is estimated at 6 million gallons out of the lift station. A first extension of the sewer line is a 24 inch diameter force main that is 13,000 feet long and has an estimated retention time of about 1 hour. A second extension of the sewer line is a force main having 30 inch diameter, a length of 66,500 feet and an estimated retention time of about 9 hours. The municipality receives downstream odor complaints near the final treatment plant.

A 25% active calcium hydroxide liquid slurry composition (AlkaGen® Solution) was delivered to the second extension of the sewer line through the upstream lift pump station at an annual average rate of approximately 1097 gallons per day. Hydrogen sulfide sensors (VaporLink® monitors, Evoqua Water Technologies LLC, Pittsburgh, Pa.) were positioned along the sewer line to capture hydrogen sulfide performance data. The monitoring locations were installed near the beginning of the sewer line and near the end of the sewer line. The sewer line had no easy access point for liquid phase sampling along the extension.

Figure 5A:
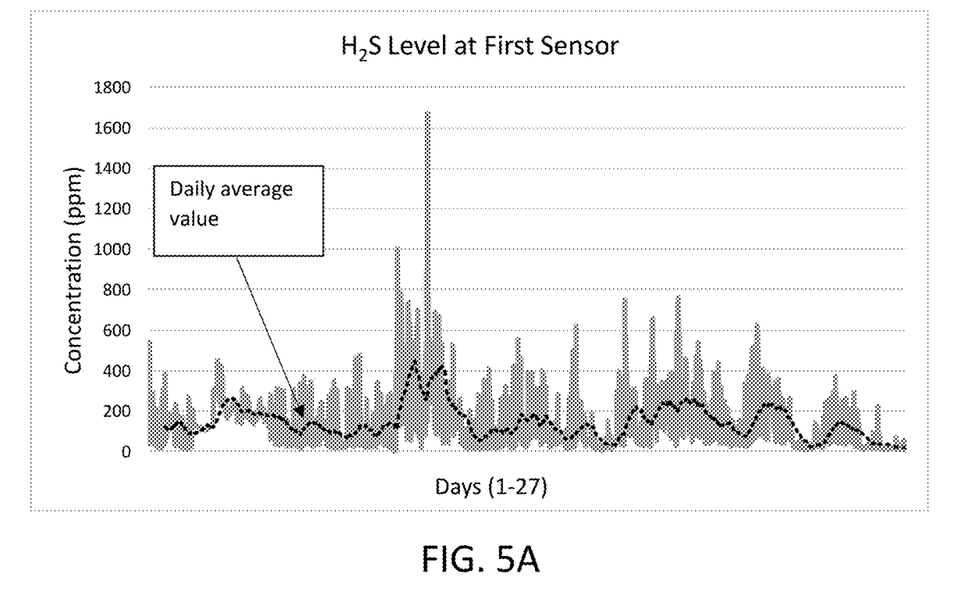
FIG. 5A is a graph of hydrogen sulfide gas detected at a first point in a sewer line.
Figure 5B:
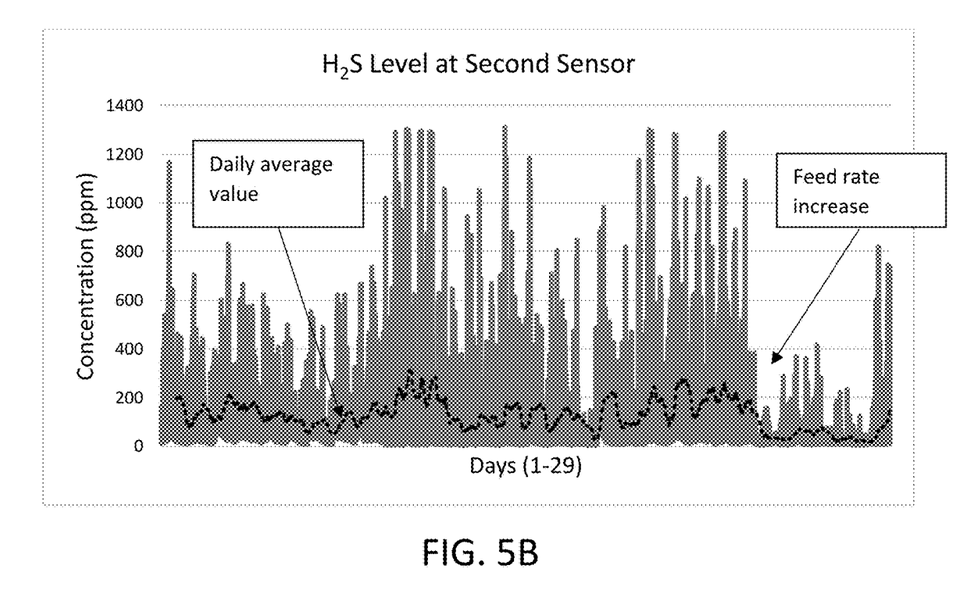
FIG. 5B is a graph of hydrogen sulfide gas concentration detected at a second point in a sewer line.

The results of the hydrogen sulfide detected in the sewer line for 27 days of measuring are presented in FIGS. 5A and 5B. FIG. 5A is a graph of the hydrogen sulfide detected near the beginning of the sewer line. The overall average value detected at the beginning of the sewer line was 144 ppm of hydrogen sulfide. FIG. 5B is a graph of the hydrogen sulfide detected near the end of the sewer line. The overall average value detected near the end of the sewer line was 125 ppm of hydrogen sulfide. The average rate of administration for the 27 days of hydrogen sulfide testing was 1039 gallons per day.

The decrease in average detected hydrogen sulfide from the first sensor to the second sensor was only 19 ppm. Calcium hydroxide administration alone is not sufficient to treat hydrogen sulfide gas for such a long sewer line. A combined product including an extended release composition is expected to provide adequate treatment (pH greater than 8.3) for the long sewer line. Table 1 is a comparative list of treatment alternatives.

TABLE 1

Odor Controlling Compositions

| Composition | Estimated dose | Estimated daily cost | Notes |
|---|---|---|---|
| 25% calcium hydroxide | 1040 gpd (130 gal per 8M gpd wastewater) | $1700 | Does not properly treat downstream flow |
| 56% magnesium hydroxide | 800 gpd (100 gal per 8M gpd wastewater) | $1700 | May treat downstream flow |
| Combined calcium hydroxide and magnesium hydroxide product | 1000 gpd | NA | Expected to provide treatment in first quarter of force main with downstream treatment in last quarter of force main |

Example 3: Blended Composition for Municipal Water Odor Control

A blended composition is proposed for the municipal sewer line of example 2 (length of 22 miles and retention time of greater than 9 hours).

The treatment plan described in example 2 involves using a fast dissolving calcium hydroxide product to treat the entire length of the force main system. The composition does not provide adequate odor control towards the end of the sewer line. A slow dissolving magnesium hydroxide product is expected to provide odor control and pH control for air emission downstream in the system but is not expected to be adequate to provide odor control and pH control near the point of administration.

An exemplary combination product may have an activity total of 25%-60%, with a calcium content of 10%-60% and a magnesium content of 40%-90%. The proposed exemplary combination is expected to provide maximum activity at 60% (6 lbs. combined product in 10 lbs. of solution). The blended combination of fast dissolving calcium hydroxide and slow dissolving magnesium hydroxide is expected to provide adequate odor control for the long force main when administered at the lift station towards the beginning of the sewer line. Adequate odor control may be achieved in the extended sewer line by administration of the exemplary blended product.

What is claimed is:

1. A method of providing sustained odor control in an extended sewer line, comprising:
   determining one or more first parameters selected from an average wastewater volume within the extended sewer line, an average wastewater flow rate within the extended sewer line, and an average wastewater retention time within the extended sewer line;
   incorporating an immediate release alkaline compound and an extended release alkaline compound into a blended composition at a selected ratio responsive to a wastewater composition in the extended sewer line, including sulfide species concentration at an inlet of the extended sewer line and microbial population of the wastewater within the extended sewer line, and in an amount sufficient to control an $H_2S$ concentration in a headspace of the extended sewer line to be 100 ppm or less along a length of the extended sewer line; and
   administering the blended composition to the extended sewer line in a selected amount responsive to the one or more first parameters.

2. The method of claim 1, further comprising measuring one or more second parameters selected from a pH of the wastewater, the $H_2S$ concentration in the headspace of the extended sewer line, a dissolved sulfide concentration in the wastewater, and a temperature of the wastewater.

3. The method of claim 2, wherein the one or more second parameters are measured at an inlet of the extended sewer line, at a point of administration of the blended composition, or downstream from the point of administration of the blended composition.

4. The method of claim 1, comprising incorporating the immediate release alkaline compound and the extended release alkaline compound in an amount sufficient to control a pH of the wastewater to be 8.0 or greater along the length of the extended sewer line.

5. The method of claim 1, wherein the length of the extended sewer line is at least about 2 miles or the average wastewater retention time within the extended sewer line is at least about 4 hours.

6. The method of claim 5, comprising administering the blended composition at a single point of administration in an amount sufficient to control the $H_2S$ concentration in the headspace of the extended sewer line to be 100 ppm or less along the length of the extended sewer line.

7. The method of claim 5, comprising administering the blended composition at a single point of administration in an amount sufficient to control a pH of the wastewater to be 8.0 or greater along the length of the extended sewer line.

8. A method of facilitating odor control in an extended sewer line, comprising:
   providing a blended composition comprising an immediate release alkaline compound and an extended release alkaline compound as active ingredients having a selected relative ratio of calcium hydroxide to magnesium hydroxide responsive to a wastewater composition in the extended sewer line, including sulfide species concentration at an inlet of the extended sewer line and microbial population of the wastewater within the extended sewer line, the blended composition being substantially free of other active ingredients; and
   providing a controller configured to administer the blended composition to the extended sewer line in an amount sufficient to control an $H_2S$ concentration in a headspace of the extended sewer line to be 100 ppm or less along a length of the extended sewer line.

9. The method of claim 8, wherein the providing the blended composition comprises providing the immediate release alkaline compound and the extended release alkaline compound in an amount sufficient to control a pH of wastewater to be 8.0 or greater along the length of the extended sewer line.

10. The method of claim 8, wherein the providing the blended composition comprises providing calcium hydroxide as the immediate release compound and magnesium hydroxide as the extended release compound.

11. The method of claim 10, wherein the providing the blended composition comprises providing a blended composition having a total active composition of between about 40% and about 60%.

12. The method of claim 11, wherein the providing the blended composition comprises providing a blended composition having a relative ratio of calcium hydroxide to magnesium hydroxide between about 1:2 to about 1:20.

13. The method of claim 8, wherein the controller is configured to instruct a metering valve to administer the blended composition at a single point of administration.

14. The method of claim 13, further comprising wherein the controller is configured to determine one or more first parameters selected from an average wastewater volume within the extended sewer line, an average wastewater flow rate within the extended sewer line, and an average wastewater retention time within the extended sewer line, and administer the blended composition in a selected amount responsive to the one or more first parameters.

15. The method of claim 13, further comprising providing at least one sensor constructed and arranged to measure one or more second parameters selected from a pH of the wastewater, the $H_2S$ concentration in the headspace of the extended sewer line, a dissolved sulfide concentration in the wastewater, and a temperature of the wastewater, and administer the blended composition in a selected amount responsive to the one or more second parameters.

16. A system for providing sustained odor control in an extended sewer line, comprising:
   a source of a blended composition connectable to the extended sewer line at a single point of administration, the blended composition comprising an immediate release alkaline compound and an extended release alkaline compound at a selected ratio responsive to wastewater composition in the extended sewer line, including sulfide species concentration at an inlet of the extended sewer line and microbial population of the wastewater within the extended sewer line;
   a metering valve positioned at the single point of administration configured to administer the blended composition to the extended sewer line;
   at least one sensor constructed and arranged to measure at least one parameter selected from headspace composition in the extended sewer line, wastewater composition in the extended sewer line, wastewater pH in the extended sewer line, wastewater temperature in the extended sewer line, and wastewater flow rate in the extended sewer line; and
   a controller operatively connected to the metering valve and to the at least one sensor, the controller configured to control administering of the selected ratio of the blended composition and instruct the metering valve to administer the blended composition in an amount responsive to the at least one parameter, sufficient to control an $H_2S$ concentration in a headspace of the extended sewer line to be 100 ppm or less along a length of the extended sewer line.

17. The system of claim 16, wherein the source of the blended composition comprises a blending subsystem constructed and arranged to incorporate the immediate release alkaline compound and the extended release alkaline compound into the blended composition in an amount responsive to the at least one parameter, sufficient to control the $H_2S$ concentration in the headspace of the extended sewer line to be 100 ppm or less.

18. The system of claim 16, wherein the at least one sensor is positioned to measure the at least one parameter downstream from the point of administration of the blended composition.

19. The system of claim 16, wherein the controller is programmable to automatically instruct the metering valve to administer the blended composition in an amount responsive to the at least one parameter sufficient to control pH of the wastewater in the extended sewer line to be within tolerance of a target value.

20. The system of claim 16, wherein the controller is programmable to recognize trends in a plurality of values of the at least one parameter measured over a time period on a schedule and automatically instruct the metering valve to administer the blended composition in an amount responsive to the recognized trends sufficient to control pH of the wastewater in the extended sewer line to be within tolerance of a target value.

* * * * *